US008563124B2

(12) United States Patent
Chmelka et al.

(10) Patent No.: US 8,563,124 B2
(45) Date of Patent: Oct. 22, 2013

(54) CARBON MATERIALS WITH INTERCONNECTED PORES

(75) Inventors: Bradley F. Chmelka, Goleta, CA (US); George L. Athens, Midland, MI (US); An-Hui Lu, Muelheim an der Ruhr (DE)

(73) Assignee: The Regents of the University of California, Oakland, CA (US)

( * ) Notice: Subject to any disclaimer, the term of this patent is extended or adjusted under 35 U.S.C. 154(b) by 285 days.

(21) Appl. No.: 12/367,471

(22) Filed: Feb. 6, 2009

(65) Prior Publication Data

US 2009/0258213 A1    Oct. 15, 2009

Related U.S. Application Data

(60) Provisional application No. 61/026,849, filed on Feb. 7, 2008.

(51) Int. Cl.
*B32B 3/26* (2006.01)
*B32B 3/06* (2006.01)

(52) U.S. Cl.
USPC ..................... 428/304.4; 428/307.3

(58) Field of Classification Search
USPC ........................................... 428/304.4, 307.3
See application file for complete search history.

(56) References Cited

U.S. PATENT DOCUMENTS

| 2004/0047798 | A1 | 3/2004 | Oh et al. |
| 2004/0091415 | A1 | 5/2004 | Yu et al. |
| 2005/0260118 | A1 | 11/2005 | Lu et al. |
| 2006/0057051 | A1* | 3/2006 | Dai et al. ................ 423/445 R |
| 2007/0116625 | A1 | 5/2007 | Joo et al. |
| 2007/0191499 | A1 | 8/2007 | Chmelka et al. |

OTHER PUBLICATIONS

Alvarez, S. et al. "Electrochemical capacitor performance of mesoporous carbons obtained by templating technique" Carbon 43 (2005) pp. 866-870.
Blumenthal, G. et al. "Investigation of the Proton Transport in Nafion Membranes as a Function of Direction, Temperature and Relative Humidity" Ionics 2 (1996) pp. 102-106.
Burke, Andrew "Ultracapacitors: why, how and where is the technology" Journal of Power Sources 91 (2000) pp. 37-50.
Kotz, R. et al. "Principles and application of electrochemical capacitors" Electrochimica Acta 45 (2000) pp. 2483-2498.
Lee, Jinwoo et al. "Synthesis of a new mesoporous carbon and its application to electrochemical double-layer capacitors" Chem. Commun., 1999, pp. 2177-2178.
Lin, Meng-Liang et al. "Well-Ordered Mesoporous Carbon Thin Film with Perpendicular Channels: Application to Direct Methanol Fuel Cell" J. Phys. Chem. C, 2008, 112(3), pp. 867-873.
Liu, Chen G. "Single-walled carbon nanotubes modified by electrochemical treatment for application in electrochemical capacitors" Journal of Power Source3s 160 (2006), pp. 758-761.
Signorelli, Riccardo et al. "Carbon Nanotube Enhanced Ultracapacitor" MIT LEES website: http://lees-web.mit.edu/lees/posters/RU13$_{13}$signorelli.pdf.

(Continued)

*Primary Examiner* — Victor Chang
(74) *Attorney, Agent, or Firm* — John P. O'Banion

(57) ABSTRACT

Methods of forming an electrically-conductive mesoporous carbon structure with interconnected pores or highly interconnected pores, and the resulting structures are described. The structure is formed by providing a mesoporous template, filling the mesopores with an organic precursor, polymerizing the organic precursor, pyrolyzing the polymerized organic precursor, and etching away the template.

9 Claims, 9 Drawing Sheets

(56) References Cited

OTHER PUBLICATIONS

Pandolfo, A.G. et al. "Carbon properties and their role in supercapacitors" Journal of Power Sources 157 (2006) pp. 22-27.

Xing, W. et al. "Superior electric double layer capacitors using ordered mesoporous carbons" Carbon 44 (2006) pp. 216-224.

Xing L. et al. "Template synthesis of ordered cubic Ia3d mesoporous carbonds with different pore sizes" Carbon 45, Issue 1, Jan. 2007, pp. 220-222.

Wang et al.—"Morphology Control of Carbon, Silica, and Carbon/Silica Nanocomposite: From 3D Ordered Macro-/Mesoporous Monoliths to Shaped Mesoporous Particles" Chem. Mater. 2008, 20, pp. 1029-1040.

Korean Intellectual Property Office, International Search Report and Written Opinion, issued Jan. 7, 2010, counterpart PCT International Patent Application No. PCT/US09/33489, including claims, 13 pages.

Ryoo, Ryung et al.—"Synthesis of Highly Ordered Carbon Molecular Sieves via Template-Mediated Structural Transformation"—Journal of Physical Chemistry B—vol. 103, No. 37, Sep. 16, 1999, pp. 7743-7746.

Kaneda, Mizue et al.—"Structural Study of Mesoporous MCM-48 and Carbon Networks Synthesized in the Spaces of MCM-48 by Electron Crystallography"—Journal of Physical Chemistry B—vol. 106, No. 6, 2002, pp. 1256-1266.

Lu, An-Hui et al.—"Nanocasting: A Versatile Strategy for Creating Nanostructured Porous Materials"—Advanced Materials—2006, 18, pp. 1793-1805.

Han, Sangjin et al.—"Simple Solid-Phase Synthesis of Hollow Graphitic Nanoparticles and their Application to Direct Methanol Fuel Cell Electrodes"—Advanced Materials—2003, 15, No. 22, pp. 1922-1925.

Joo, Sang Hoon et al.—"Ordered nanoporous arrays of carbon supporting high dispersions of platinum nanoparticles"—Nature—vol. 412, Jul. 12, 2001, pp. 169-172.

Choi, Won Choon et al.—"Platinum Nanoclusters Studded in the Microporous Nanowalls of Ordered Mesoporous Carbon"—Advanced Materials—vol.17, No. 4, 2005, pp. 446-451.

Fuertes, Antonio B. et al.—"Mesoporous carbons with graphitic structures fabricated by using porous silica materials as templates and iron-impregnated polypyrrole as precurser"—Journal of Materials Chemistry—vol. 15, 2005, pp. 1079-1083.

Lee, Jinwoo et al.—"Synthesis of a new mesoporous carbon and its application to electrochemical double-layer capacitors"—Chem. Commun.—1999, pp. 2177-2178.

Liu, C. et al.—"Hydrogen Storage in Single-Walled Carbon Nanotubes at Room Temperature"—Science—vol. 286, Nov. 5, 1999.

Liang, Chengdu et al.—"Synthesis of a Large-Scale Highly Ordered Porous Carbon Film by Self-Assembly of Block Copolymers"—Agnew. Chem. Int. Ed.—vol. 45, 2004, pp. 5785-5789.

Tanaka, Shunsuke et al.—"Synthesis of ordered mesoporous carbons with channels structure from an organic-organic nanocomposite"—Chem. Commun.—2005, pp. 2125-2127.

Lee, Jinwoo et al.—"Recent Progress in the Synthesis of Porous Carbon Materials"—Advanced Materials—vol. 18, 2006, pp. 2073-2094.

Kim, Chy Hyung et al.—"Graphitic Mesostructured Carbon Prepared from Aromatic Precursors"—Langmuir—vol. 20, 2004, pp. 5157-5159.

Barrett, Elliott et al.—"The Determination of Pore Volume and Area Distributions in Porous Substances. I. Computations from Nitrogen Isotherms"—vol. 73, Jan. 1951, pp. 373-380.

Brunauer, Stephen et al.—"Adsorption of Gases in Multimolecular Layers"—vol. 60, Feb. 1937, pp. 309-319.

Fuertes, Antonio B. et al.—"Graphitic mesoporous carbons synthesised through mesostructured silica templates"—Carbon—vol. 42, 2004, pp. 3049-3055.

Zhao, Dongyuan et al.—"Continuous Mesoporous Silica Films with Highly Ordered Large Pore Structures"—Advanced Materials—vol. 10, No. 16, 1998, pp. 1380-1385.

Alberius, Peter C.A. et al.—"General Predictive Syntheses of Cubic, Hexagonal, and Lamellar Silica and Titania Mesostructured Thin Films"—Cem. Matter, vol. 14, 2002, pp. 3284-3294.

Che, Shunai et al.—"Synthesis of Large-Pore Ia3d Mesoporous Silica and Its Tubelike Carbon Replica"—Agnew. Chem. Int. Ed., vol. 42. 2003, pp. 3930-3934.

Jun, Shinae et al.—"Synthesis of New, Nanoporous Carbon with Hexagonally Ordered Mesostructure"—J. Am. Chem. Soc.—vol. 122, 2000, pp. 10712-10713.

Kim, Tae-Wan et al. "A Synthetic Route to Ordered Mesoporous Carbon Materials with Graphitic Pore Walls"—Agnew. Chem. Int. Ed., vol. 42, 2003, pp. 4375-4379.

Lee, Jinwoo et al.—"Development of a New Mesoporous Carbon Using an HMS Aluminosilicate Template"—Advanced Materials—Advanced Materials—vol. 12, No. 5, 2000, pp. 359-362.

Yamada, Hirotoshi et al. "Electrochemical Study of High Electrochemical Double Layer Capacitance of Ordered Porous Carbons with Both Meso/Macropores and Micropores" J. Phys. Chem C 2007, 111, pp. 227-233.

Yoon, S. et al. "Electric Double-Layers Capacitor Performance of a New Mesoporous Carbon" Journal of the Electrochemical Society, 147 (7), 2000, pp. 2507-2512.

Zhang, H. et al. "Capacitive performance of an ultralong aligned carbon nanotube electrode in an ionic liquid at 60 C" Carbon 46 (2008) pp. 30-34.

* cited by examiner

CARBON MATERIALS WITH INTERCONNECTED PORES

CROSS-REFERENCE TO RELATED APPLICATIONS

This application claims priority from U.S. provisional application Ser. No. 61/026,849, filed on Feb. 7, 2008, incorporated herein by reference in its entirety.

STATEMENT REGARDING FEDERALLY SPONSORED RESEARDH OR DEVELOPMENT

This invention was made with Government support under Grant No. DAAD19-01-1-0121, awarded by the U.S. Army Research Office (USARO). The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to synthesis of mesoporous carbon materials, and more particularly to structures and methods of forming electrically-conductive mesoporous carbon materials using a sacrificial template.

2. Incorporation By Reference

The following publications are incorporated herein by reference in their entirety:

1. Ryoo, R.; Joo, S. H.; Jun, S. *J. Phys. Chem. B* 1999, 103, 7743-7746.
2. Kaneda, M; Tsubakiyama, T.; Carlsson, A.; Sakamoto, Y.; Ohsuna, T.; Terasaki; O.; Joo, S. H.; Ryoo, R. *J. Phys. Chem. B* 2002, 106, 1256-1266.
3. Lu, A.-H.; Schüth, F. *Adv. Mater.* 2006, 18, 1793-1805.
4. Han, S. J.; Yun, Y. K.; Park, K. W.; Sung, Y. E.; Hyeon, T. *Adv. Mater.* 2003, 15, 1922-1925.
5. Joo, S. H.; Choi, S. J.; Oh, I.; Kwak, J.; Liu, Z.; Terasaki, O.; Ryoo, R. *Nature* 2001, 412, 169-172.
6. Choi, W. C.; Woo, S. I.; Jeon, M. K.; Sohn, J. M.; Kim, M. R.; Jeon, H. J. *Adv. Mater.* 2005, 17, 446-451.
7. Fuertes, A. B.; Centeno, T. A. *J. Mater. Chem.* 2005, 15, 1079-1083.
8. Lee, J.; Yoon, S.; Hyeon, T.; Oh, S. M.; Kim, K. B. *Chem. Commun.* 1999, 2177-2178.
9. Liu, C.; Fan, Y. Y.; Liu, M.; Cong, H. T.; Cheng, H. M.; Dresselhaus, M. S. *Science* 1999, 286, 1127-1129.
10. Liang, C.; Hong, K.; Guiochon, G. A.; Mays, J. W.; Dai, S. *Angew. Chem. Int. Ed.* 2004, 43, 5785-5789.
11. Tanaka, S.; Nishiyama, N.; Egashira, Y.; Ueyama, K. *Chem. Commun.* 2005, 2125-2127.
12. Lee, J.; Kim, J.; Hyeon, T. *Adv. Mater.* 2006, 18, 2073-2094.
13. Kim, C. H.; Lee, D.-K.; Pinnavaia, T. J. *Langmuir* 2004, 20, 5157-5159.
14. Barrett, E. P.; Joyner, L. G.; Halenda, P. P. *J. Am. Chem. Soc.* 1951, 73, 373-380.
15. Brunauer, S.; Emmett, P. H.; Teller, E. *J. Am. Chem. Soc.* 1938, 60, 309-319.
16. Fuertes, A. B.; Alvarez, S. *Carbon* 2004, 42, 3049-3055.
17. Zhao, D.; Yang, P.; Melosh, N.; Feng, J.; Chmelka, B. F.; Stucky, G. D. *Adv. Mater.* 1998, 10, 1380-1385.
18. Alberius, P. C. A.; Frindell, K. L.; Hayward, R. C.; Kramer, E. J.; Stucky, G. D.; Chmelka, B. F. *Chem. Mater.* 2002, 14, 3284-3294.

3. Description of Related Art

In recent years, there has been growing interest in the synthesis of porous carbon materials templated by ordered porous inorganics. In particular, mesostructured carbon materials have been considered for potential application as high surface area adsorbents, catalyst supports, and hydrogen storage materials. Recently, there have been reports published on the syntheses of mesoporous carbons that make use of block-copolymer-directed mesoporous silica materials as templates, due to the thermal and mechanical stabilities of silica, mesostructural ordering of the pore networks, high surface areas, tailorable porosities, and processabilities. As several of the aforementioned applications require mass transport through the carbon material, mesoporous silica templated carbon materials have been synthesized with highly interconnected pore networks, such as the Pm $\overline{3}$ m, Im $\overline{3}$ m, and Ia $\overline{3}$ d structures. While mesoporous carbons with these structures have been reported in powder and fiber morphologies, mesoporous carbon materials have not previously been synthesized into technologically relevant film or monolith morphologies with interconnected pores, and particularly highly interconnected pores, nor with electrical conduction properties. Electrically conductive carbon films and monoliths with interconnected pores have potential for new applications as high surface area electrodes, capacitors, and electrocatalysts.

Previous efforts to synthesize porous carbon films have produced mesostructured carbon films containing 2D hexagonal ordering, with pores that are not generally interconnected and that have not been demonstrated to be electrically conductive. Some researchers have used polystyrene-block-poly(4-vinylpyridine) mesostructured thin film into which an organic precursor resorcinol was imbibed. After polymerization of the resorcinol monomers and carbonization of the film, a well-ordered mesoporous carbon film was obtained. However, high-resolution transmission electron microscopy found no sign of graphitic pore walls, suggestive of non-conductive, amorphous carbon walls. More recently, some researchers were able to directly self-assemble a mesostructured carbon film by spin-coating a resorcinol/Pluronic F127® triblock-copolymer solution onto a silicon substrate. The resulting film was carbonized in an inert atmosphere or in vacuo at temperatures up to 800° C. Again, while this method produced well-ordered hexagonally mesostructured carbon films, the relatively low carbonization temperatures required are expected to yield films with poor electrical conductivity (if any).

BRIEF SUMMARY OF THE INVENTION

Opportunities exist for improving interfacial contact between ion-conduction membranes, ion-exchange membranes, and the electrodes in PEM fuel cell devices, as well as for increasing the surface area and performance of electrocatalysts and capacitors. In particular, there is interest in developing proton exchange materials that retain high proton conductivities at elevated temperatures near 150° C. To our knowledge, there are currently no reports in literature on the synthesis of high surface area, electrically-conductive mesoporous carbon films or monoliths possessing interconnected pores or highly interconnected pore networks. Embodiments of the inventions disclosed herein advantageously can provide for the synthesis of high surface area, electrically-conductive mesoporous carbon films possessing interconnected pore networks or highly interconnected pore networks.

Accordingly, an aspect of the present invention is to focus on the synthesis and characterization of electrically conducting, high surface-area porous (including mesoporous) carbon films with interconnected pores or highly interconnected pores (including cubically arranged mesopores) that can serve as electrodes, capacitors, or catalyst supports in fuel cell, battery, ultra-capacitor, and electrochemical device applications. Another aspect of the invention is to provide a general methodology for forming porous carbon materials from a variety of different porous templates with different size pores and in macroscopic morphologies other than films, including monoliths.

According to another aspect of the present invention, porous (including mesoporous) silica films (including thin films) with cubic (including body-centered cubic) (Im $\overline{3}$ m space-group) structural (including mesostructural) ordering are used as templates to form porous (including mesoporous) carbon films (including thin films). These novel porous carbon films combine the attributes of porous inorganic films (e.g., high surface area, adjustable pore diameters, and interconnected 3D pore networks) along with those of carbon (e.g., electrical conductivity and chemical and thermal stability). Another aspect of the invention is to use a vapor deposition method that allows for uniform pore-filling of the silica template films with organic precursor species over large sample areas.

Another aspect of the invention is a method of forming a porous or mesoporous carbon structure with interconnected pores or highly interconnected pores, which also can be an electrically-conductive structure. In one embodiment, the method includes the steps of providing a porous (or mesoporous) template having a plurality of pores (or mesopores), filling the pores (or mesopores) with an organic precursor, polymerizing the organic precursor, pyrolyzing the polymerized organic precursor to produce carbon (which may be electrically-conductive), and selectively etching away the template to yield a porous (or mesoporous) carbon structure with interconnected pores or highly interconnected pores, and which may be electrically-conductive.

In various embodiments, the organic precursor is selected from the group consisting of sucrose, phenolic resin, resorcinol, naphthalene, furfuryl alcohol, and aromatic-containing organic precursors. In one embodiment, the organic precursor has a low molecular weight.

In various embodiments, the porous (or mesoporous) template comprises a material selected from the group consisting of silica (including mesostructured silica), titania, alumina, oxides, organosiloxanes, nitrides, phosphides, carbides, chalcogenides, organometallic compounds, metals, or mixtures thereof. In one embodiment, the template comprises a porous (or mesoporous) silica film (or thin film) with cubic (including body-centered cubic) ordering (including mesostructural ordering). Preferably, the porous (or mesoporous) structure comprises a film (including a thin film) and may be electrically-conductive.

Another aspect of the invention is a porous (or mesoporous) carbon structure. In one embodiment, the structure comprises an electrically-conductive mesoporous carbon structure with interconnected pores or highly interconnected pores that is formed in a mesoporous template having a plurality of mesopores by filling the mesopores with an organic precursor, wherein the organic precursor is polymerized, the polymerized organic precursor is then pyrolyzed to produce electrically-conductive carbon, and then the template is selectively etched away to yield said electrically-conductive mesoporous carbon structure with interconnected pores or highly interconnected pores.

Another aspect of the invention is a method of forming a film with a porous carbon structure with interconnected pores, comprising: providing a mesoporous silica template film having a plurality of pores; filling the pores with a carbon precursor; polymerizing the carbon precursor; pyrolyzing the polymerized carbon precursor to produce electrically-conductive carbon; and selectively etching away the template film to yield a film with a mesoporous carbon structure with interconnected pores Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a schematic illustration depicting the process for preparing mesoporous carbon films. Pyrolysis temperatures of ≥900° C. are typically used to produce electrically-conductive carbon materials. Etching of the silica template is usually performed by soaking the material in a HF solution.

FIG. 2($b$) is a schematic illustration of the cross-section etched by the SIMS Cs+ ion beam.

FIG. 5($b$) shows mesopore-size-distribution plots obtained from a Barrett-Joyner-Halenda (BJH) analysis of the adsorption branch isotherms for the mesoporous silica template [■], the mesoporous silica film containing pyrolyzed carbon [▲], and the mesoporous carbon film and silica etching [●].

Figure 8:
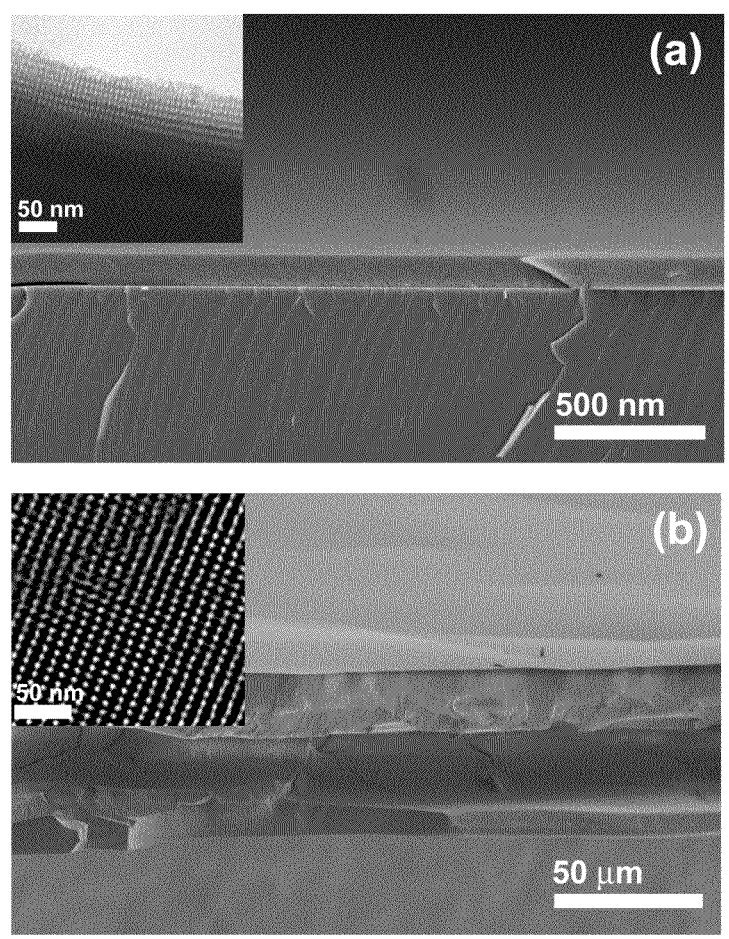
FIG. 8 shows electron microscopy images of mesoporous silica films with cubic (Im $\bar{3}$ m) structures for (a) a 190-nanometer-thick silica film prepared by dip-coating on a polished silicon wafer, and (b) a 62-micrometer-thick free-standing film.
Figure 9:
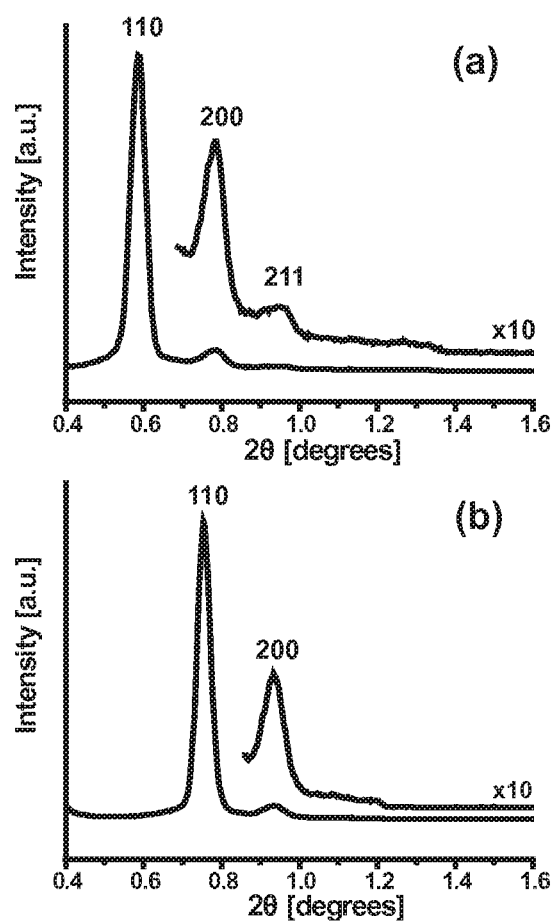

FIG. 9 shows small-angle X-ray scattering patterns of a free-standing mesostructured silica film (a) as-synthesized and (b) following solvent-extraction of the structure-directing triblock copolymer species. The diffraction patterns are indexed to the body-centered-cubic (Im $\bar{3}$ m) structure. FIG. 9(b) corresponds to the same film shown in FIG. 8(b).

DETAILED DESCRIPTION OF THE INVENTION

Figure 1:
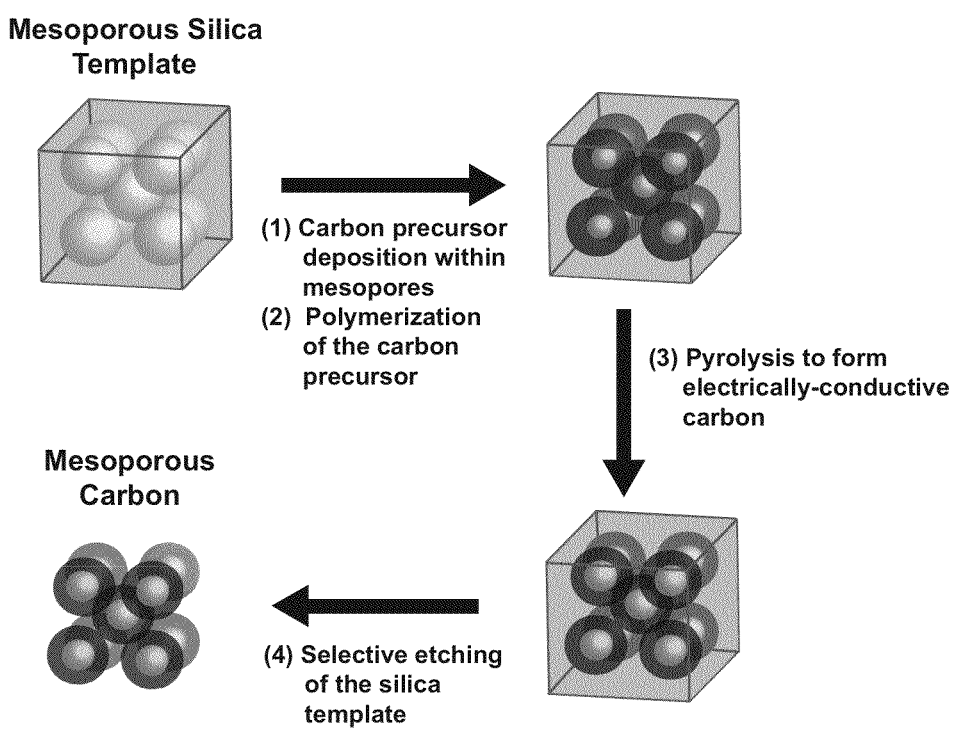

Porous or mesoporous carbon films may be templated from pre-formed porous or mesoporous films (including thin films). In one non-limiting embodiment of the invention illustrated in FIG. 1, following separate formation of a mesoporous silica template, the templating process involves four further steps as illustrated in FIG. 1: (1) filling the pore volume of mesoporous silica template with a low-molecular-weight organic precursor, (2) polymerizing the organic precursor within the silica mesopores, (3) pyrolyzing the polymerized (and thus non-volatile) organic precursor to yield chemically-stable, electrically-conductive carbon, and (4) selectively etching away the silica template to leave behind mesoporous carbon. Thus, the structure of the resulting carbon material resembles that of the mesopore channels, formed originally by the hydrophobic component of the block-copolymer structure-directing species in the as-synthesized parent template. A wide variety of organic precursor compounds have been used, including sucrose, phenolic resin, resorcinol, naphthalene, and furfuryl alcohol. The choice of organic precursor can have a significant effect on the nature of the subsequent mesoporous carbon material. In particular, the use of aromatic-containing organic precursors, in combination with sufficiently high pyrolysis temperatures in the absence of oxygen, yields carbonaceous products with improved graphitic structures and higher electrical conductivities, compared to carbons formed by non-aromatic precursors such as sucrose.

In some mesoporous materials such as those with hexagonal arrangements of cylinder-like pores, there is little or no interconnection between pores. As those skilled in the art will appreciate, embodiments discussed herein can provide a high degree of interconnection between pores. For example, in cubic mesostructured materials, well over 50% the pores are interconnected to at least one other pore, and those of skill will appreciate how to balance the precursors and growth conditions for uniformity, so that a mesoporous material having more than 99% of pores interconnected will result. Specifically, block-copolymer-templated mesoporous silica can be synthesized with three-dimensionally interconnected channels (e.g., with a cubic Im $\bar{3}$ m space group structure). In the present invention, preferably >50% of the pores are interconnected to at least one other pore, more preferably >90% of the pores are interconnected to at least one other pore, more preferably >95% of the pores are interconnected to at least one other pore, and more preferably >99% of pores are interconnected with at least one other pore.

EXAMPLE 1

Template Film Synthesis

Mesostructured silica films possessing body-centered-cubic Im $\bar{3}$ m ordering were prepared using the procedures described in Zhao et al., *Adv. Mater.* 1998, 10, 1380-1385 and Alberius et al., *Chem. Mater.* 2002, 14, 3284-3294, both of which are incorporated herein by reference.

These films can be prepared using amphiphilic block-copolymer species as structure-directing and film forming agents. This was achieved by dip-coating a precursor solution of poly(ethyleneoxide)-b-poly(propyleneoxide)-b-poly(ethyleneoxide) triblock copolymer species, e.g., Pluronic™ F127 ($EO_{106}PO_{70}EO_{106}$) in the presence of a hydrolyzed silica species under acidic conditions onto a polished silicon substrate at room temperature. As the substrate was withdrawn from the precursor solution, volatile solvent components evaporated from the deposited film, thereby promoting self-assembly of the triblock copolymer species, along with co-assembly and subsequent formation of a densely cross-linked silica network. Film thickness was controlled by varying the ethanol concentration, and thus the viscosity, of the dip-coating solution, and/or by adjusting the dip-coating rate, with the process being complete in about one minute. Alternatively, free-standing mesostructured silica films were cast from an identical precursor solution in an open vessel, from which volatile components were allowed to evaporate over the period of about one week. The structure-directing triblock copolymer species were subsequently removed by either calcination or solvent extraction to introduce mesoporosity into the films.

Specifically, 2.0 g of the poly(ethylene oxide)-poly(propylene oxide)-poly(ethylene oxide) triblock copolymer Pluronic F127 ($EO_{106}PO_{70}EO_{106}$) from BASF were dissolved in 20 g $C_2H_5OH$, and separately, a silica sol solution was prepared consisting of 8.2 g tetraethoxysilane (TEOS), 0.007 g HCl, 3.6 g water, and 12 g $C_2H_5OH$. The separate solutions were covered, stirred at room temperature for 1 hour, and then mixed to yield a precursor solution with a molar ratio of 1.0 TEOS:0.004 F127:0.0045 HCl:5.0 $H_2O$:20 $C_2H_5OH$, which was subsequently stirred for an additional 2 hours at room temperature. Supported thin films were formed by dip-coating, in which a polished silicon substrate was removed vertically from the precursor solution at a rate of ~3 mm/s. Films can also be prepared by spin coating or casting. For example, free-standing films or were formed by casting the precursor solution in a loosely covered polystyrene Petri dish and allowing the volatile solvents to evaporate under ambient conditions over approximately 1 week. For the supported silica films, the structure-directing triblock copolymer species were removed and silica cross-linking increased by thermal oxidation (calcination) in air. This was achieved by heating the films at 1° C./min to 550° C. and holding at this temperature for 8 hours to produce smooth crack-free thin films. The triblock copolymer species in the free-standing films were solvent extracted by refluxing in ethanol for 24 hours to minimize thermally induced micro-cracking. Solvent extraction effectively removed 95% of the triblock copolymer species from the free-standing films.

EXAMPLE 2

Mesoporous Carbon Film Synthesis

The pore dimensions and structural ordering can be adjusted according to the selection of the structure-directing low-molecular-weight surfactant, block-copolymer, or colloidal species used to prepare the porous template. Mesoporous silica thin film templates were specifically synthesized in the same manner as described in Example 1. However, due to the need for high temperature (≥900° C.) treatment of the films, the block copolymer/silica precursor solution was dip-coated onto polished quartz substrates coated with a 200 nm thick layer of SiN instead of polished silicon wafers. The presence of the SiN intermediate layer serves to reduce cracking of the mesoporous silica film during the high temperature treatment and to promote adhesion and prevent lift-off of the carbon film after etching the silica template. The supported mesostructured silica films were calcined at 450° C. in air to remove the structure-directing triblock copolymer species.

Furfuryl alcohol ($C_5H_6O_2$, 2-furanmethanol, 98.10 g/mol, 1.130 g/cm$^3$, normal melting point=-29° C., normal boiling point 170° C.) was used as an organic precursor and vapor-deposited along the mesopore surface areas of the silica template films by combining the supported silica films in a sealed container with 0.5 mL furfuryl alcohol under a nitrogen atmosphere. The sealed container was heated at 50° C. for 2 h. Subsequently, the furfuryl alcohol was removed from the container and replaced by 0.1 mL of 37 wt % HCl solution also under a nitrogen atmosphere. The resealed container possessing the carbon-deposited silica template films and the acid catalyst was heated to 100° C. for 6 hours to allow for polymerization of the furfuryl alcohol monomers within the silica template mesopores. The silica template films containing polymerized furfuryl alcohol were placed in a fused quartz reactor and pyrolyzed by heating under vacuum to 900° C. at 1° C./min followed by holding at 900° C. for 8 hours. Finally, the silica template was removed by soaking the films in either HF or KOH solutions. The mesoporous carbon films would lift off of the substrate during the silica etching without the presence of the of the SiN layer.

EXAMPLE 3

Characterization

X-ray diffraction, transmission electron microscopy, and nitrogen sorption techniques allowed for full characterization of the mesostructural ordering in the films. X-ray diffraction patterns were collected using a Phillips X'PERT MPD Thin Film Powder Diffractometer using 1.54 Å Cu $K_\alpha$, radiation. Transmission electron microscopy (TEM) samples were prepared by Focused Ion Beam (FIB) milling of a 200 nm thick cross-sectional slice of the mesoporous carbon thin film using a FEI DB235 Dual-Beam Focused Ion Beam system with a gallium ion beam accelerated at 30 kV. Prior to cross-sectioning, a layer of platinum was deposited on the film surface to reduce beam damage to the sample during milling. The TEM sample was transferred to a holey carbon grid by plucking the sample with a sharpened glass needle. TEM images were collected on a FEI T20 microscope operating at 200 kV. Nitrogen sorption isotherms were collected with a TriStar 3000 Gas Adsorption Analyzer. The mesoporous films were detached from the quartz substrates and outgassed under nitrogen at 120° C. overnight prior to measurement. The mesopore size distributions were calculated from the adsorption branches of the nitrogen isotherms according to the Barrett-Joyner-Halenda (BJH) method, and the surface areas of the film were determined by the Brunauer-Emmett-Teller (BET) method.

Depth-profiling of the carbon and silicon in the thin films, prior to etching of the silica template, was accomplished by secondary ion mass spectrometry (SIMS) using a Physical Electronics 6650 Dynamic SIMS system. A beam of accelerated $Cs^+$ ions was rastered across roughly a 300 μm×500 μm etched rectangular area. Four-point probe electrical conductivity measurements were performed on the films using a Keithley 2400 Current/Voltage Source Meter.

EXAMPLE 4

Results and Discussion

A. Carbon Deposition.

Figure 2:
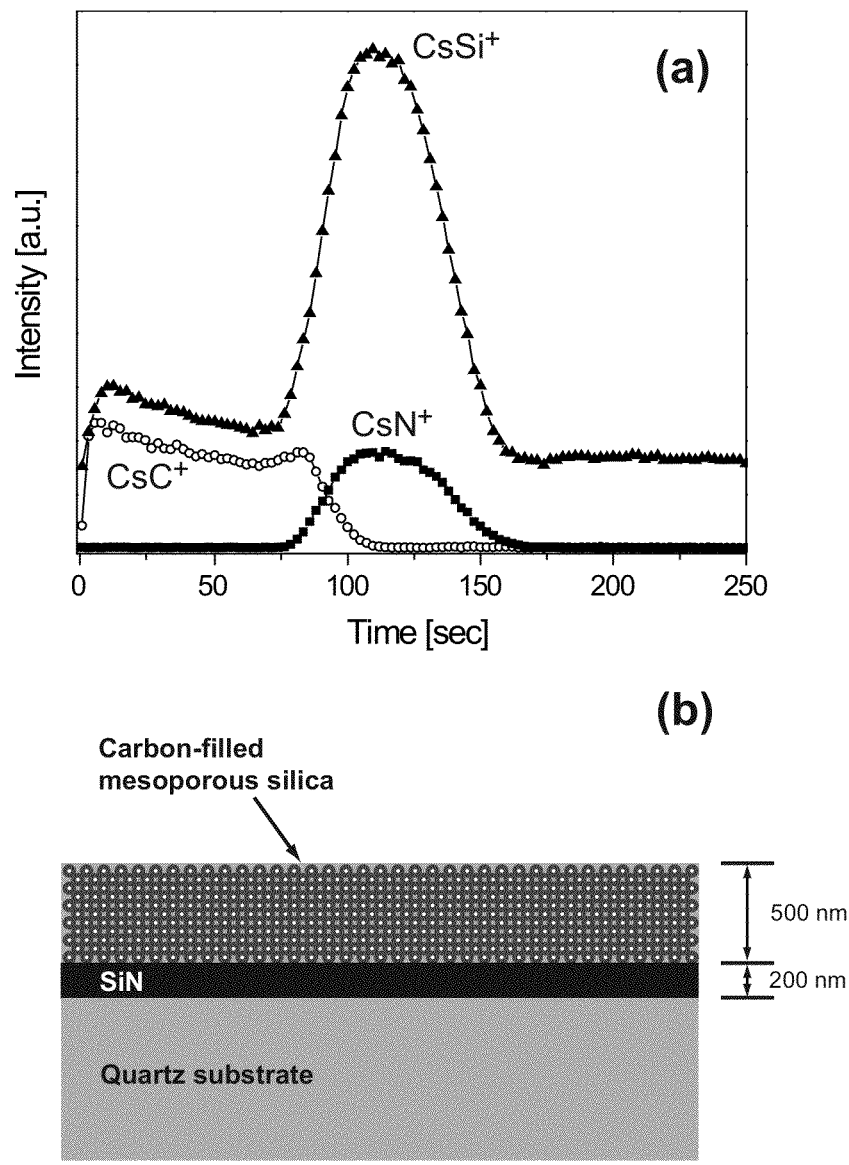
FIG. 2($a$) shows carbon, silicon, and nitrogen depth profiles through the carbon-containing mesoporous silica template film and underlying substrate layers (SiN and quartz), as obtained from secondary-ion mass spectroscopy measurements.

Dynamic secondary ion mass spectrometry (SIMS) established the extent of carbon incorporation into the mesopores of the silica template film. Prior to etching away the silica template, depth-profiles of the carbon, silicon, and nitrogen contents in the various layers of the sample were measured (FIG. 2) to determine if the carbon completely filled the silica mesopores across the entire film thickness. Without penetration of the carbon through the entire silica template film, contact between the mesoporous carbon film and substrate will not occur and the carbon will lift-off the substrate when the silica template is etched away. As can be seen in FIG. 2(a), the carbon signal ($CsC^+$) appears immediately upon etching the sample, continues at steady signal intensity, and drops to zero when the SiN layer is reached, as evident by the co-existent increase in the nitrogen signal ($CsN^+$). In addition, the silicon signal ($CsSi^+$) increases upon complete etching of the silica template/carbon film due to the change in silicon density between the mesoporous silica template film and the SiN substrate coating. The large area probed by the rastering ion beam means that these profiles are representative of the entire film.

B. Structural Ordering.

Figure 3:
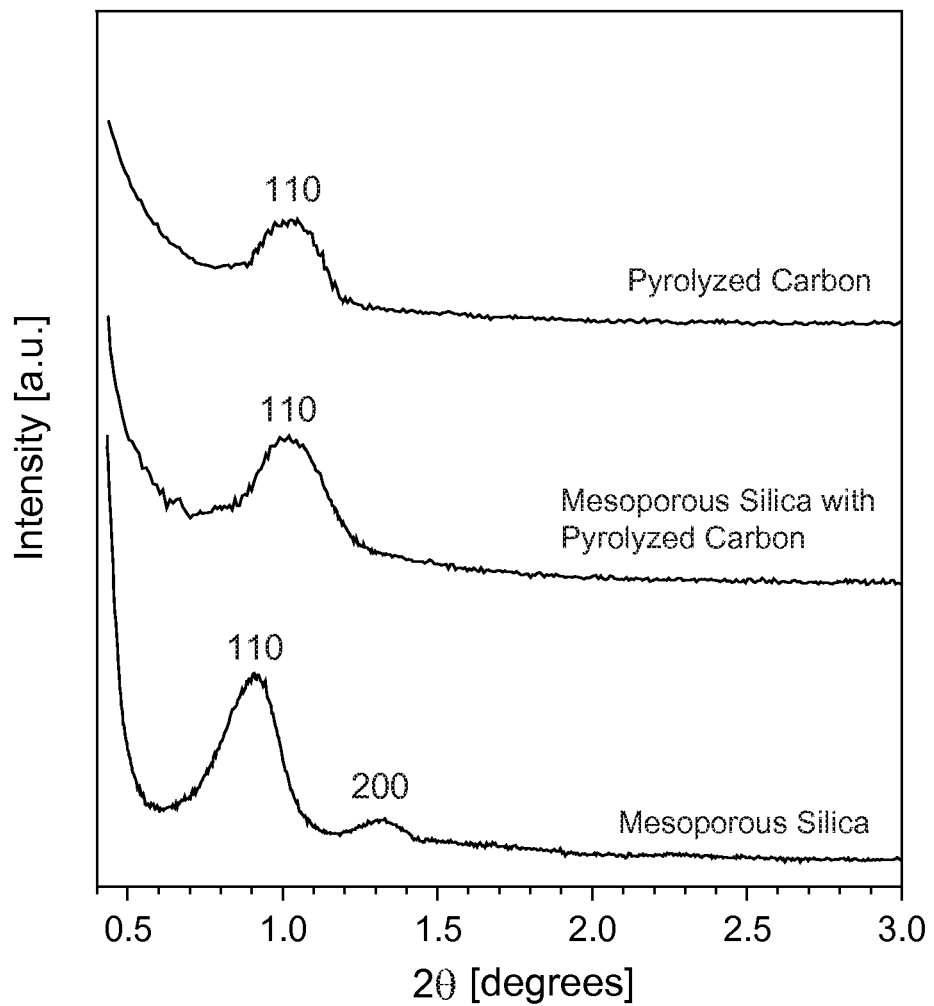
FIG. 3 shows small-angle X-ray scattering patterns of (bottom) the mesoporous silica template film, (middle) the silica template filled with pyrolyzed carbon, and (top) the mesoporous pyrolyzed carbon film remaining after acid etching of the silica template. The diffraction patterns are indexed to the cubic structure, with the corresponding (110) and (200) reflections labeled.

Mesostructural ordering in the silica template film is generated by the amphiphilic triblock copolymer species F127® ($EO_{106}PO_{70}EO_{106}$), according to the solution composition and conditions reported in Example 1. Small-angle X-ray scattering patterns for the mesoporous silica template film establish that the meso-structural ordering is of the body-centered-cubic Im$\bar{3}$m structure. The SAXS diffraction pattern (FIG. 3) shows two Bragg reflections, whose d-spacings at 9.7 nm and 6.8 nm can be indexed to the (110) and (200) reflections of the Im$\bar{3}$m space group, respectively. Upon filling the interconnected cubic mesopore network with furfuryl alcohol, its polymerization to reduce its volatility, and subsequent pyrolysis within the mesopores, the SAXS pattern of the silica/carbon composite film shows a single broad Bragg reflection, presumably (110), of the cubic structure, with a d-spacing of 8.6 nm. Removal of the silica template by acid-etching results in further broadening of this reflection in the SAXS pattern, indicating a reduction in the overall mesostructural ordering in the film. However, the fact that the diffraction peak, although broadened, remains after etching of the silica template confirms that the carbon film retains a highly mesoporous structure, though with reduced ordering.

Figure 4:
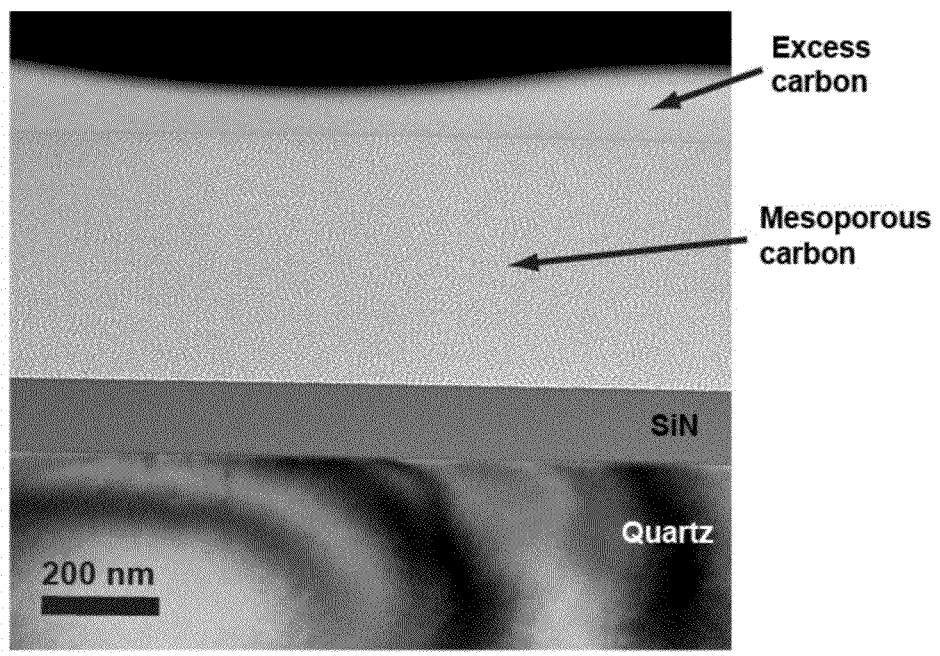
FIG. 4 is a cross-sectional transmission electron micrograph of the mesoporous carbon film supported on a SiN-coated quartz substrate. The mesoporous carbon film corresponds to the one measured by SAXS in FIG. 3.

Transmission electron micrographs of the mesoporous carbon films are consistent with the SAXS results. As shown in FIG. 4, a representative cross-sectional TEM image of the carbon films after pyrolysis and removal of the silica template show that the films are 480 nm thick and have porosity on the mesoscopic length scale. TEM results also reveal the presence of excess carbon as an over-layer on the top surface of the mesoporous carbon film. The undulating thickness of the excess carbon layer suggests that it was produced by pyrolysis of furfuryl alcohol droplets that formed during vapor deposition. Most efforts to synthesize meso-porous carbon via the templating process have filled the template pore volumes with a liquid organic precursor. While liquid organic precursors can also be impregnated into mesoporous silica thin films, the TEM images confirm that the vapor deposition of organic monomers reduces the excess carbon deposited on top of the mesoporous silica thin film, compared to liquid precursor species.

Figure 5:
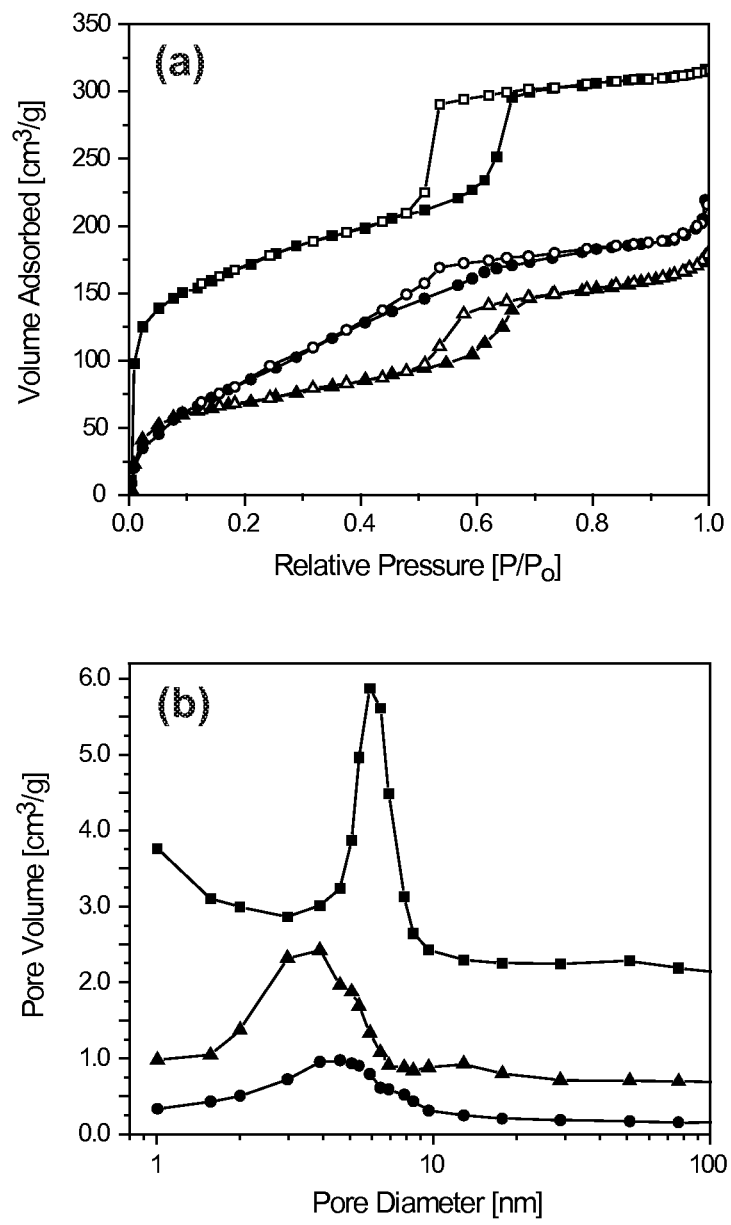
FIG. 5($a$) shows nitrogen adsorption-desorption isotherms acquired at 77 K.

Nitrogen sorption measurements shown in FIG. 5(a) provide insights into the accessible surface areas and extent of mesopore connectivity in the mesoporous films. The mesoporous silica template yielded a BET surface area of 385 $m^2/g$, and Barrett-Joyner-Halenda (BJH) analysis of the material establishes a pore diameter distribution sharply centered at 5.9 nm (FIG. 5(b)). The silica template containing pyrolyzed carbon within the mesopores displays a reduced surface area of 292 $m^2/g$ and mean pore diameter of 3.9 nm, revealing that the carbon forms an approximate 1 nm thick layer along the mesopore surfaces. Removal of the silica template increases the accessible surface area of the mesoporous carbon to 339 $m^2/g$. The fact that the BET surface area of the mesoporous carbon film is 12% less than that of the original mesoporous silica template film is most likely due to the diminished mesostructural ordering of the carbon film.

C. Electrical Conductivity.

Figure 6:
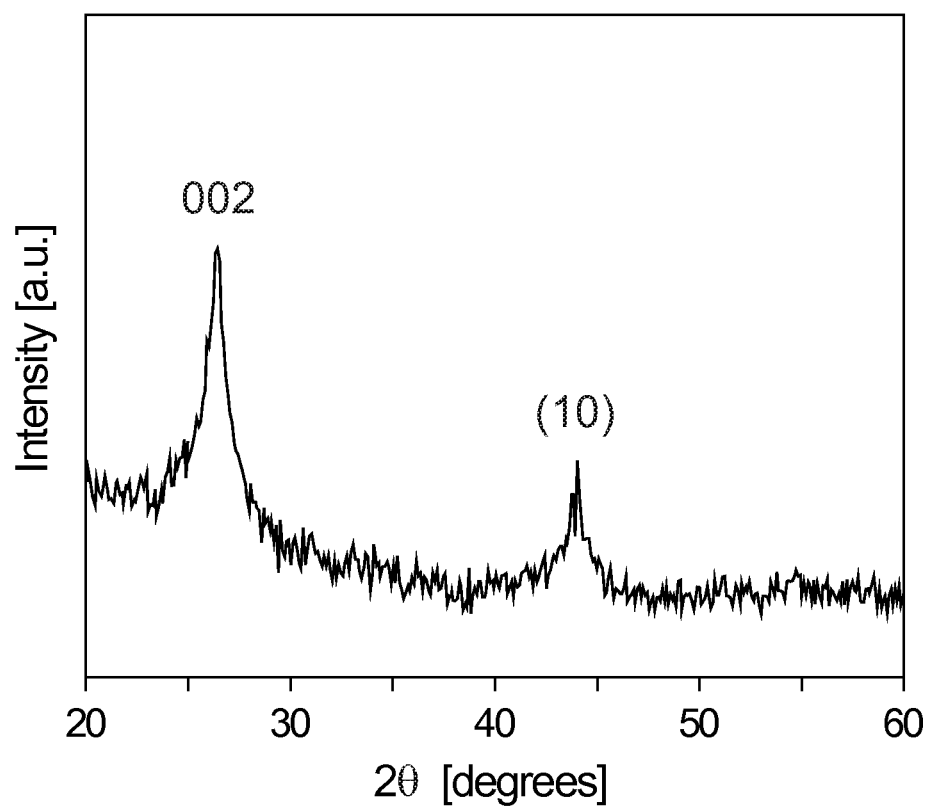
FIG. 6 is a wide-angle X-ray diffraction (XRD) pattern of the mesoporous carbon film after removal of the silica template showing (002) and (10) reflections associated with graphite. The sample measured corresponds to that in FIG. 4.

The electrical properties of mesoporous carbons are critical for the application of these materials as electrodes, ultracapacitors, or electrocatalyst supports. Electronic conductivity in the mesoporous carbon materials is correlated with the degree of graphitic ordering in the framework. X-ray diffraction (XRD) patterns in the wide-angle region (10-90) allow the graphitic nature of the pyrolyzed carbon to be assessed. In FIG. 6, the two Bragg peaks in the XRD pattern at $2\theta=26°$ and 44° are assigned to the (002) and (10) reflections of graphitic carbon in the framework of the mesoporous carbon thin film. The extent of conversion of the amorphous polymerized furfuryl alcohol precursor within the mesoporous silica template to a graphitic carbon material is influenced by the temperature of the pyrolysis heat treatment. In the examples presented here, pyrolysis temperatures below 1000° C. have been used to facilitate processing in conjunction with the use of quartz substrates, although in other embodiments when carbon materials are treated at temperatures in excess of 2000° C. the material can possess significantly higher graphitic ordering. Electrical conductivity of mesostructured carbon can be substantially improved by increasing its graphitic character.

Figure 7:
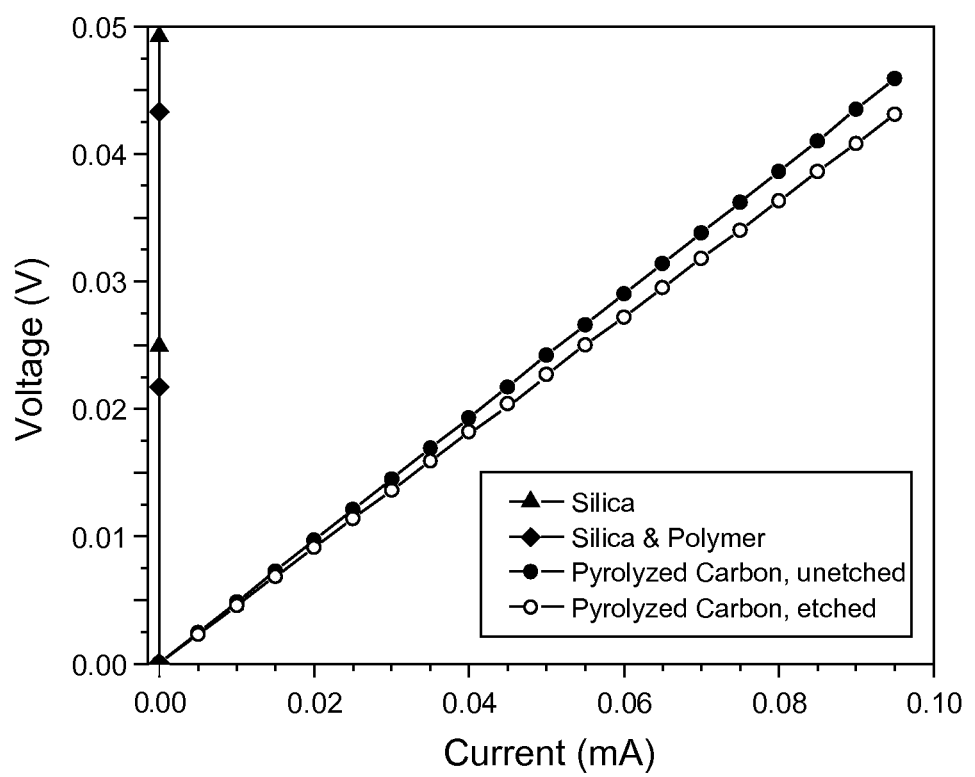
FIG. 7 shows four-point probe dc voltage-current measurements for the mesoporous silica template, the silica template filled with polymerized furfuryl alcohol precursor, and the pyrolyzed mesoporous carbon films with and without the silica template removed by acid etching. Electronic conductivity is calculated from the slope of the V-I curve.

Current-voltage measurements of the mesoporous silica and carbon films establish the electronic conductivity properties of the films. Four-point probe dc conductivity measurements (FIG. 7) of the silica template film yield a near vertical V-I plot that corresponds to low electronic conductivity values of $8.8 \times 10^{-4}$ S/cm, which are typical of electrically-insulating materials. Inclusion of the polymerized furfuryl alcohol precursor species within the mesopore volumes of the silica film only slightly improves the electronic conductivity to $9.6 \times 10^{-4}$ S/cm. High temperature pyrolysis under vacuum converts the polymerized precursor to a graphitic state, and as a result, drastically increases the electronic conductivity of the material. This increase in conductivity is apparent in FIG. 7, evidenced by the relatively low slopes of the V-I curves for the pyrolyzed carbon films. Pyrolyzed carbon films with and without the silica template possess electronic conductivity values of 9.4 S/cm and 10.1 S/cm, respectively. By comparison, some researchers previously reported conductivity values up to 1.55 S/cm for pressed mesoporous carbon powders. The powders possessed graphitic carbon frameworks with varying degrees of atomic order and uncertain (and apparently low) extent of interparticle contact. The more-than six fold improvement in conductivity reported here for mesoporous carbon films is attributed to reduced contact resistances compared to between the powder particles.

D. Material Structure.

FIG. 8 and FIG. 9 show transmission and scanning electron microscopy images of the cubic mesostructured (Im3m) silica template according to an aspect of the invention (as-synthesized and after removal of the structure-directing triblock copolymer species), prior to deposition of the organic precursor species (its polymerization, pyrolysis to form carbon, etc.). FIG. 8 shows electron microscopy images of mesoporous silica films according to the invention with cubic (Im $\overline{3}$ m) structures. More particularly, FIG. 8(a) shows SEM and TEM (inset) micrographs showing a tilted cross-sectional view and cubic pore ordering, respectively, for a 190-nanometer-thick silica film prepared by dip-coating on a polished silicon wafer. FIG. 8(b) shows SEM and TEM (inset) micrographs showing similar features for a 62-micrometer-thick free-standing film. FIG. 9 shows small-angle X-ray scattering patterns of a free-standing mesostructured silica film (a) as-synthesized (FIG. 9(a)), and (b) following solvent-extraction of the structure-directing triblock copolymer species (FIG. 9(b)). The diffraction patterns are indexed to the body-centered-cubic (Im $\overline{3}$ m) structure. FIG. 9(b) corresponds to the same film as shown in FIG. 8(b).

Conclusions

In summary, cubic mesoporous silica thin films can be used to template mesoporous carbon films by vapor deposition of a volatile organic precursor species, such as furfuryl alcohol. Polymerization and subsequent high temperature pyrolysis in the absence of oxygen of the organic precursor within the cubic mesopore network of the silica template produces a high surface area, electrically-conductive film. The silica template can be readily removed via HF or KOH etching to yield a mesoporous carbon film with accessible surface areas of 339 $m^2/g$ and electronic conductivity values up to 10.1 S/cm. These conductive, high surface area films are promising for applications associated with fuel cells, batteries, capacitors, electrodes, and electrocatalysts.

Although the above description provides specific examples, these should not be construed as limiting the scope of the invention but as merely providing illustrations of some of the presently preferred embodiments of this invention.

Furthermore, those skilled in the art will appreciate that the inventive method of forming carbon materials with interconnected pores or highly interconnected pores encompasses casting, spin- or dip-coating, self-assembly, polymerization, and/or adsorption of organic and inorganic species, which are converted to carbonaceous and/or inorganic networks, in which the inorganic network is subsequently principally removed to yield a porous carbon material.

In various alternative embodiments, the inorganic network may be silica (including mesostructured silica), titania, alumina, oxides, organosiloxanes, nitrides, phosphides, carbides, chalcogenides, organometallic compounds, metals, or mixtures thereof.

In further various embodiments, the porous carbon material can have a cubic, hexagonal, or disordered pore structure. Preferably, the porous carbon material is functionalized on the interior pore surfaces. Also, the porous carbon material is preferably electrically-conductive. In one embodiment, the porous carbon material has a surface area greater than 100 m²/g. In one embodiment, the porous carbon material has an electrical conductivity greater than 5 S/cm.

In various embodiments, the porous carbon material may be a film, a fiber, a monotlith, or a powder. Also note that the porous carbon material may be used in capacitor applications, electrode applications, fuel cell or battery applications, or in microelectronic or opto-electronic applications.

In various embodiments, the organic species may be surfactant or polymer species, including block-copolymers, and may include furfuryl alcohol, phenol, or aromatic or unsaturated organic compounds that are incorporated, for example, by adsorption or imbibition. In a preferred embodiment, the organic species are pyrolyzed to yield said carbonaceous network. In various embodiments, the organic and/or inorganic species may be processed in the presence of one or more solvents.

Therefore, it will be appreciated that the scope of the present invention fully encompasses other embodiments which may become obvious to those skilled in the art and is not intended to be limited to the above description or the appended claims. In addition, it is contemplated that in further embodiments the present invention as described above may be combined with the aspects, modes, embodiments, functions and/or features known in the art and in U.S. Patent Application Publication No. 2007/0191499 A1, incorporated herein by reference in its entirety.

Furthermore, in the appended claims, reference to an element in the singular is not intended to mean "one and only one" unless explicitly so stated, but rather "one or more." All structural, chemical, and functional equivalents to the elements of the above-described embodiments that are known to those of ordinary skill in the art are expressly incorporated herein by reference and are intended to be encompassed by the present disclosure and claims. Moreover, it is not necessary for a device or method to address each and every problem sought to be solved by the present invention, for it to be encompassed by the present disclosure claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A film with a porous carbon structure, comprising:
   an electrically-conductive porous carbon structure with interconnected pores;
   wherein said carbon structure is formed in a mesoporous template film with cubic mesostructural ordering having a plurality of mesopores by filling the pores with an organic precursor, polymerizing the organic precursor, pyrolyzing the polymerized organic precursor to produce electrically-conductive carbon, selectively removing the template film to yield said electrically-conductive porous carbon structure with interconnected pores; and
   wherein at least 50% of the pores are interconnected to at least one other pore within the carbon structure.

2. A film as recited in claim 1, wherein said mesoporous template film comprises a material selected from the group consisting of silica, titania, alumina, oxides, organosiloxanes, nitrides, phosphides, carbides, chalcogenides, organometallic compounds, metals, or mixtures thereof.

3. A film as recited in claim 1, wherein said organic precursor is selected from the group consisting of sucrose, phenolic resin, resorcinol, naphthalene, furfuryl alcohol, or aromatic-containing organic precursors.

4. A film as recited in claim 1, wherein said porous template film comprises a mesoporous film with body-centered-cubic Im $\bar{3}$ m ordering.

5. A film as recited in claim 1, wherein said porous template film is prepared by spin-coating, dip-coating, or casting a structure-directing organic species in the presence of a network-forming inorganic species, followed by removal of said structure-directing organic species.

6. A film as recited in claim 1, wherein said electrically-conductive mesoporous structure comprises a mesoporous film.

7. A film as recited in claim 1, wherein said porous carbon structure has a surface area greater than approximately 100 m²/g.

8. A film as recited in claim 1, wherein said porous carbon structure has an electrical conductivity greater than approximately 5 S/cm.

9. A film as recited in claim 1, wherein said interconnected pores are highly interconnected with greater than 90% of the pores interconnected to at least one other pore.

* * * * *